United States Patent [19]

Fowler et al.

[11] 4,322,998
[45] Apr. 6, 1982

[54] INTEGRAL STORE SUSPENSION AND COMMUNICATION DEVICE

[75] Inventors: Steven E. Fowler; George N. Hennings; Joseph E. Hibbs; Stephen L. Redmond; Richard M. Swenson, all of Ridgecrest, Calif.

[73] Assignee: The United States of America as represented by the Secretary of the Navy, Washington, D.C.

[21] Appl. No.: 88,494

[22] Filed: Oct. 26, 1979

[51] Int. Cl.³ .............................................. F41F 5/02
[52] U.S. Cl. .................................. 89/1.5 D; 89/1.5 G
[58] Field of Search ................. 89/1.5 D, 1.5 E, 1.5 F, 89/1.5 G; 102/201; 294/83 AA

[56] References Cited

U.S. PATENT DOCUMENTS

| | | | |
|---|---|---|---|
| 2,939,102 | 5/1960 | Johnson | 89/1.5 D |
| 3,158,060 | 11/1964 | Semenoff et al. | 89/1.5 D |
| 3,211,057 | 10/1965 | White et al. | 89/1.5 D |
| 3,504,592 | 4/1970 | Damm et al. | 89/1.5 D X |
| 3,667,342 | 6/1972 | Warnock et al. | 89/1.5 D |
| 4,091,734 | 5/1978 | Redmond et al. | 102/215 X |
| 4,132,147 | 1/1979 | Contaldo | 89/1.5 G |

Primary Examiner—David H. Brown
Attorney, Agent, or Firm—Robert F. Beers; W. Thom Skeer

[57] ABSTRACT

An Integral Store Suspension and Communication Device (ISSCD) that transfers power and data to and from a store, senses store separations, and provides mechanical suspension of a store.

7 Claims, 5 Drawing Figures

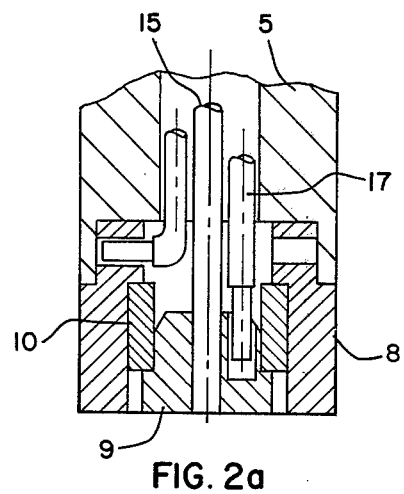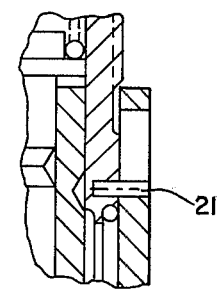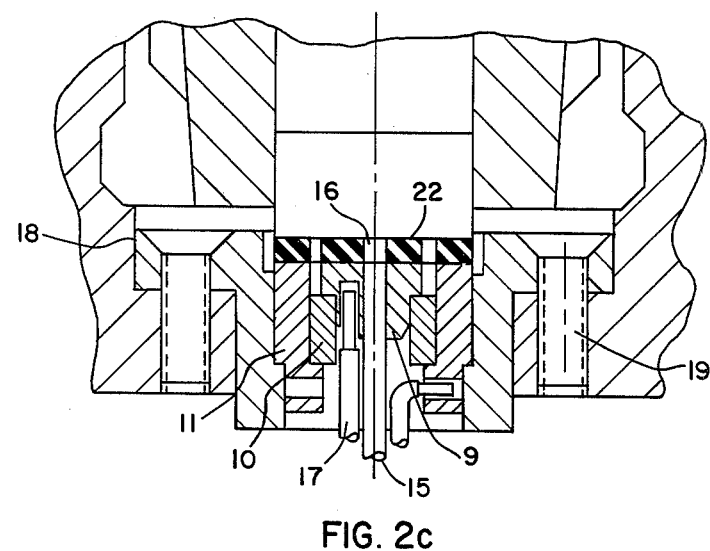
FIG. 2a
FIG. 2b
FIG. 2c

INTEGRAL STORE SUSPENSION AND COMMUNICATION DEVICE

BACKGROUND OF THE INVENTION

The services practice is to develop aircraft to store interfaces on a store to store basis. Such practice causes a proliferation of aircraft to store interfaces that are unique for each store and aircraft. This, in many cases, results in a particular store being useable with only one aircraft and rack configuration. These interfaces, consisting of arming wires, lanyards, and multipin connectors have marginal reliability based upon dependence of the conscientiousness of the person making the connection for correct operation. An illustrative example of the problem is the dropping of electrically-fuzed bombs from Navy Aircraft wherein, even under controlled conditions, ten percent or more of the bombs are duds due to faulty or misconnected connectors, harnesses, umbilicals or arming wires. This rate worsens considerably under combat conditions and thus noticeably detracts from the fleet's goal to stress readiness and effectiveness.

DESCRIPTION OF THE PRIOR ART

The standardized aircraft to weapon fuze communication link was established recently in an effort to standarize the data transmission between an aircraft and a weapon fuse. One U.S. Pat. No. 4,091,734 so far has evolved therefrom. It is assigned to the same assignee as this U.S. Patent application. And, even though the invention illustrated is a vast improvement over previous systems, namely, a light source communication link, it does not satisfy the pressing problem of complete store interfacing standardization.

An aircraft load lifting rig having a configuration only somewhat similar to applicants is also observed in West Germany Pat. No. 26 29 523, issued Jan. 1, 1976.

OBJECTS OF THE INVENTION

It is an object of this invention to provide an integral store suspension and communication device having all necessary functions therein.

A further object of this invention is to provide an integral communication system for the store that is automatically connected when the store is attached to a suspension system.

Another object of this invention is to provide increased reliability based upon all necessary functions being operable when the store is attached to a suspension system.

A still further object of this invention is to provide an integral bi-directional optical data link.

Another object of this invention is to provide an integral separation sensor.

Still another object of this invention is to provide a locking mechanism which is automatically engaged when store is attached.

Another object of this invention is to provide energy for returning the locking mechanism to a stored mode when the device is released.

A still further object of this device is to provide a plunger containing the electro-optical interface in an intimate relationship with said interference.

Another object of this invention is to provide an optical system mechanically positioned out of line when a store is not attached to the aircraft to provide eye safety.

BRIEF DESCRIPTION OF THE DRAWINGS

Illustrative examples of the present invention are shown in the accompanying drawings wherein:

FIG. 2(a) is a sectional view illustrating the power and data interface components; FIG. 2(b) is a sectional view showing connector lock and collet lock roll pin in the locked position; and FIG. 2(c) is a sectional view of the ISSCD communication interface.

DESCRIPTION OF THE PREFERRED EMBODIMENTS

Figure 1A:
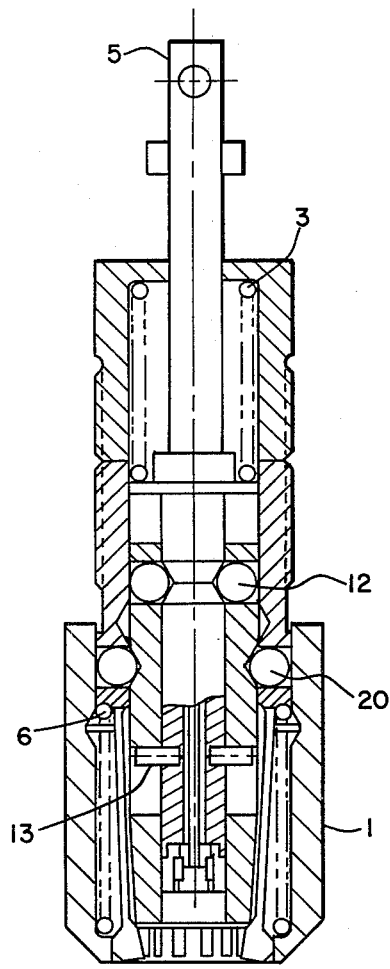
FIG. 1(a) and FIG. 1(b) are sectional views of the ISSCD in the open and locked positions.

The Integral Store Suspension and Communication Device (ISSCD) is shown in the attached drawings. The ISSCD, shown in the attached drawings, is composed of the following parts: sleeve lock 1, collet lock 2, plunger spring 3, cylinder lock 4, plunger 5, sleeve spring 6, suspension adapter 7, outer contact ring 8, inner contact ring 9, contact ring insulator 10, split contact ring 11, ball bearings 12, roll pins 13, optical alignment assembly 14, fiber optics bundle 15, fiber optic interface 16, wire (18 AWG) 17, contact ring holder 18, flat head screws 19, ball bearings 20, roll pins 21, and conductive rubber 22. The ISSCD is shown in the open position in FIG. 1(a) and in the closed position in FIG. 1(b). The power interface components of the ISSCD are the outer contact ring 8, inner contact ring 9, and the contact ring insulator 10. The power is carried to the interface components via two 18 AWG wires 17. The data interface is composed of a fiber optic bundle 15 with an optical alignment assembly 14 at the top of the plunger 5 and a fiber optic interface 16 at the face of the inner contact ring 10. The optical alignment assembly 14 is held out of alignment with the incoming optical signal while the ISSCD is in the open position. The final part of the communication system of this device is a separation sensor which is composed of a split outer contact ring 11 on the store side and a complete outer contact ring 8 on the aircraft side. In the open condition there is no continuity between the two sides of the split contact ring. Continuity between the two sides indicates the store is connected to the aircraft. This signal is used by the store circuity to determine separation.

Figure 1B:
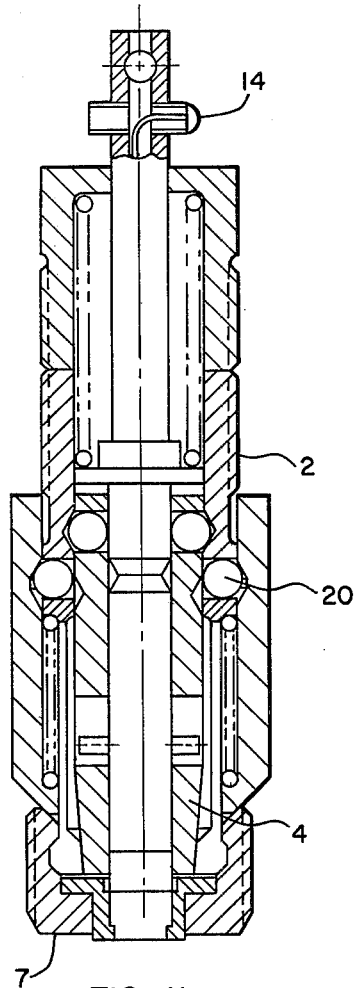

In the open position, the ISSCD stores the energy required for the mechanical operation of the ISSCD in the compressed plunger spring 3. The plunger 5 is prevented from moving by four ball bearings 12 which rest in a groove on the plunger 5 and in four holes drilled through the cylinder lock 4. The cylinder lock 4 is prevented from moving by two ball bearings 20 which rest on a groove in the plunger 5 and in two holes in the collect lock 2. The ball bearings 20, as shown in FIG. 1(b), provide the "locking mechanism" for the ISSCD and are used to lock the ISSCD in both the open and closed positions.

The sleeve lock 1 of the ISSCD prevents the second set of ball bearings 12 from moving. This provides the open position lock for the device and prevents the cylinder lock 4 and plunger 5 from moving. The sleeve lock 1 is used to compress the collet lock 2, increasing the ease of activation during store loading.

The ISSCD is activated when the sleeve lock 1 is pushed upward by the suspension adapter 7, compressing the sleeve spring 6 and allowing two ball bearings 20 to move into the groove on the sleeve lock 1. The sleeve lock 1 groove reaches alignment with the ball bearings 20 as the tines on the collet lock 2 expand into the groove on the adapter. The ball bearings 20 are forced out into the slot on the sleeve lock 1 by the force generated by the plunger spring 3 and the angled face of the groove. Once the ball bearings 20 are free of the cylinder lock 4, the plunger spring 3 then accelerates the plunger 5 cylinder lock 4 assembly towards the suspension adapter 7. As the cylinder lock 4 reaches the end of its travel, the tines of the collet lock 2 are wedged open and the ball bearings 12 are forced out of the groove on the plunger 5 and into a groove on the collet lock 2, freeing the plunger 5 from the cylinder lock 4 and locking it in place.

Once the ball bearings 12 coupling the cylinder lock 4, and plunger 5 slide into the groove on the collet lock 2, the plunger 5 continues to travel until it compresses the conductive rubber 22 on the store side of the interface. In this position the plunger 5 locks the ball bearings 12 into the groove on the collet lock 2, which in effect, locks the ISSCD in the mechanically closed position and also performs the electrical and optical coupling.

The optical alignment assembly 14 located at the upper part of the plunger 5 is moved into alignment with another fiber optic path located within the rack. The optics, in this position, carry information to and from the aircraft through the ISSCD and into the store.

Electrical power is carried to the store through wires from the aircraft, through the plunger mechanism, to the contact ring interface of the ISSCD. The outer contact ring 8 and split contact ring 11 are used as power ground with the inner contact ring 9 used to carry power for the store. The contact ring mechanism is prevented from shorting by the contact ring insulator 10 on both the aircraft and store sides.

The contact ring interface conductive rubber 22 is used to provide a low resistance path and to provide self wiping of the contact rings. The closing of the outer contact ring 8 and split contact ring 11 also serves as a separation sensor input for the store. This is accomplished by measuring the resistance from one side split ring 11 to the other. The measurement of small resistance, R less than 5Ω, indicates the store is attached. The measurement of large resistance, R greater than 1000Ω, indicates the store is released. Any resistance value greater than 5Ω but less than 1000Ω indicates a faulty connection.

The ISSCD must be activated from an external mechanical power source to release the store. The store is released by pulling the plunger 5 upward, breaking the power and data interface and compressing the plunger spring 3. As the plunger 5 moves upward, the four roll pins 13, which couple the plunger 5 to the cylinder lock 4, reach the upper end of the slot on the cylinder lock 4 and force it upward. This upward force causes the ball bearings 12 to move from the groove on the collet lock 2 into the groove on the plunger 5, which is aligned with the holes through the cylinder lock 4. The movement of the ball bearings 13 into the groove on the plunger 5 frees the cylinder lock 4 to move upward with the plunger 5, and with four roll pins 13, couples the plunger 5 to the cylinder lock 4, transmitting the unlocking force to the cylinder lock 4. In this state, the plunger 5 and cylinder lock 4 assembly moves upward, further compressing the plunger spring 3 and freeing the tines of the collet lock 2. This assembly continues to move upward until the groove on the cylinder lock 4 is aligned with the two through holes on the collet lock 2 containing the two ball bearings 20.

The ISSCD, in this position, provides minimal mechanical restraint, approximately 20 lbf, between the store and aircraft, allowing the store to either drop away or be ejected. Upon release of the store, the energy stored in the sleeve spring 6 forces the two ball bearings 20 out of the groove on the sleeve lock 1 and into the groove on the cylinder lock 4. The sleeve lock 1 is forced down by the sleeve spring 6 until it reaches the end of travel controlled by the two roll pins 21 which couple the sleeve lock 1 to the collet lock 2.

This ends the lock-unlock cycle for the ISSCD. In this position, the tines on the collet lock 2 are slightly compressed by the sleeve lock 1 and the ISSCD is locked in the open position by the two ball bearings 20 in the groove on the cylinder lock 4.

The invention provides an advantage of having the communication system, a bi-directional optical data link, a separation sensor, and a locking mechanism that is automatically engaged when store is attached, as an integral part of the suspension system.

Obviously many modifications are possible within the scope of the disclosed inventive concept. And, although the invention has been described in a preferred embodiment, it will be understood that it is not limited to the device shown and described, and that various changes and modifications may be made by those skilled in the art without departing from the scope of the invention. It is intended to cover all such modifications to the appended claims.

We claim:
1. An integral store suspension and communication device, ISSCD, comprising:
   an internal mechanical suspension means for the suspension of a store;
   power transmitting means for supplying and transferring power to and from said store and including separation responsive contacts which charge electrical characteristics to permit sensing store separation; and
   information transmitting means for receiving and transferring data to and from said store.
2. An integral store suspension and communication device as set forth in claim 1 wherein:
   said internal mechanical suspension means comprises a locking mechanism that automatically engages when said store is attached.
3. An integral store suspension and communication device as set forth in claim 2 wherein said internal mechanical suspension includes:
   a spring for storing energy for locking said ISSCD mechanism.
4. An integral store suspension and communication device as set forth in claim 1 wherein:
   said information transmitting means comprises mechanical, electrical, magnetic, and fiber optics.
5. An integral store suspension and communication device as set forth in claim 1 wherein:
   said information transmitting means comprises a bi-directional optical data link.
6. An integral store suspension and communication device as set forth in claim 5 wherein:
   said information transmitting means comprises an electro-optical interface that comprises a biasing means for intimate contact of said interface.
7. An integral store suspension and communication device as set forth in claim 5 wherein:
   said information transmitting means is mechanically positioned out-of-line when a store is released to provide eye safety.

* * * * *